(12) United States Patent
Bourgeois

(10) Patent No.: US 9,055,839 B1
(45) Date of Patent: Jun. 16, 2015

(54) OUTDOOR FRYING APPARATUS

(75) Inventor: Norman Bourgeois, Jefferson, LA (US)

(73) Assignee: METAL FUSION, INC., Jefferson, LA (US)

(*) Notice: Subject to any disclaimer, the term of this patent is extended or adjusted under 35 U.S.C. 154(b) by 571 days.

(21) Appl. No.: 13/100,411

(22) Filed: May 4, 2011

Related U.S. Application Data

(60) Provisional application No. 61/331,061, filed on May 4, 2010.

(51) Int. Cl.
*A47J 37/12* (2006.01)
*F24C 3/08* (2006.01)

(52) U.S. Cl.
CPC ....................................... *A47J 37/12* (2013.01)

(58) Field of Classification Search
CPC ........ A47J 36/20; A47J 37/1247; A47J 36/38
USPC ...... 126/40, 30, 37 R, 38, 211, 218, 25 R, 51, 126/332, 1 R, 391, 9 R, 376.1, 343.5 A, 357, 126/390, 92 AC, 373, 376, 387; 99/403, 99/418, 340, 482, 330, 324, 410, 413, 336
See application file for complete search history.

(56) References Cited

U.S. PATENT DOCUMENTS

| | | | | |
|---|---|---|---|---|
| 2,528,776 A | * | 11/1950 | Pappas | 99/411 |
| 4,334,462 A | * | 6/1982 | Hefling | 99/385 |
| 4,420,006 A | | 12/1983 | Moore et al. | |
| 4,623,544 A | | 11/1986 | Highnote | |
| 4,848,318 A | * | 7/1989 | Brewer | 126/376.1 |
| 5,209,218 A | | 5/1993 | Daneshvar et al. | |
| 5,355,776 A | * | 10/1994 | Driskill | 99/330 |
| 5,396,832 A | * | 3/1995 | Simon | 99/337 |
| 5,398,668 A | | 3/1995 | Daneshvar et al. | |
| 5,544,567 A | * | 8/1996 | Davis et al. | 99/336 |
| 5,577,438 A | | 11/1996 | Amitrano et al. | |
| 5,632,266 A | * | 5/1997 | Sato | 126/391.1 |
| 5,642,660 A | | 7/1997 | Killgore et al. | |
| 7,707,929 B1 | * | 5/2010 | Bourgeois et al. | 99/340 |

* cited by examiner

*Primary Examiner* — Dana Ross
*Assistant Examiner* — Ket D Dang
(74) *Attorney, Agent, or Firm* — Garvey, Smith, Nehrbass & North, L.L.C.; Charles C. Garvey, Jr.; Vanessa M. D'Souza

(57) ABSTRACT

An outdoor food frying apparatus provides a frame that includes a cabinet having an open top and a open bottom. The frame can be in the form of a plurality of cabinet walls supportive upon a plurality of legs. A burner element is supported upon the frame and within the cabinet interior. The burner element includes a pair of spaced apart burner sections. A pot removably fits the cabinet interior resting upon the pot support in a cooking position. The pot has a v-shaped bottom comprised of a pair of panels that intercept to form a obtuse angle. The pot also includes a plurality of generally flat pot side walls. One of the burner sections directs a flame against one of the bottom panels, the other of the burner sections directing a flame against the other of the bottom panels. In one embodiment, the pot has a drain opening fitted with a valve for controlling the flow of fluid from the pot after cooking has completed. In one embodiment, a slot on the cabinet extends to the open top, the valve traveling in the slot when the pot is placed upon the frame in a cooking position. In one embodiment, a plurality of baskets are provided that selectively fit the pot interior including one basket that substantially fills the cabinet interior and a second basket that is much smaller than the first basket.

24 Claims, 12 Drawing Sheets

OUTDOOR FRYING APPARATUS

CROSS-REFERENCE TO RELATED APPLICATIONS

Priority of U.S. Provisional Patent Application Ser. No. 61/331,061, filed May 4, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to gaseous fueled fired outdoor frying devices such as deep fat fryers. More particularly, the present invention relates to an improved outdoor frying apparatus having a specially configured frame that supports a specially configured pot and a basket or baskets that fit the pot interior and wherein specially configured burner arrangement transfers heat to the pot bottom.

2. General Background of the Invention

Many food frying devices have been patented. Examples can be found in the following table.

The following U.S. Patents are incorporated herein by reference:

| PAT. NO. | TITLE | ISSUE DATE |
| --- | --- | --- |
| 4,420,006 | Spray Cleaning System for Frying Apparatus | Dec. 13, 1983 |
| 4,623,544 | Constant Temperature Fryer/Cooker Assembly | Nov. 18, 1986 |
| 5,209,218 | Deep Frying Apparatus | May 11, 1993 |
| 5,398,668 | Deep Frying Apparatus | Mar. 21, 1995 |
| 5,577,438 | Gas Fired Deep Fat Fryer | Nov. 26, 1996 |
| 5,642,660 | Gas Fired Deep Fat Fryer | Jul. 1, 1997 |

BRIEF SUMMARY OF THE INVENTION

The present invention provides a food frying apparatus for use in an outdoor setting. The apparatus includes a frame which includes a cabinet having an open top and an open bottom and a plurality of side walls. A burner element is supported upon the frame within the cabinet, the burner element being positioned below the opened top.

The burner element includes a pair of spaced apart burner sections. These burner sections can be generally parallel to one another.

A pot removably fits the cabinet interior, resting upon a pot support in a cooking position.

In one embodiment, the pot provides a tapered or V-shaped bottom. The bottom can be comprised of a pair of panels that intersect to form an angle, such as an obtuse or right angle. The pot also includes a plurality of pot side walls that extend upwardly from the bottom panels.

One of the burner sections directs the flame against one of the bottom panels. The other of the burner sections directs a flame against the other of the bottom panels. The pot can provide a drain opening. The drain opening can be fitted with a valve for enabling selective draining of the contents of the pot.

In one embodiment, a slot on the cabinet extends to the open top, the valve traveling in the slot when the pot is placed upon the frame in a cooking position.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
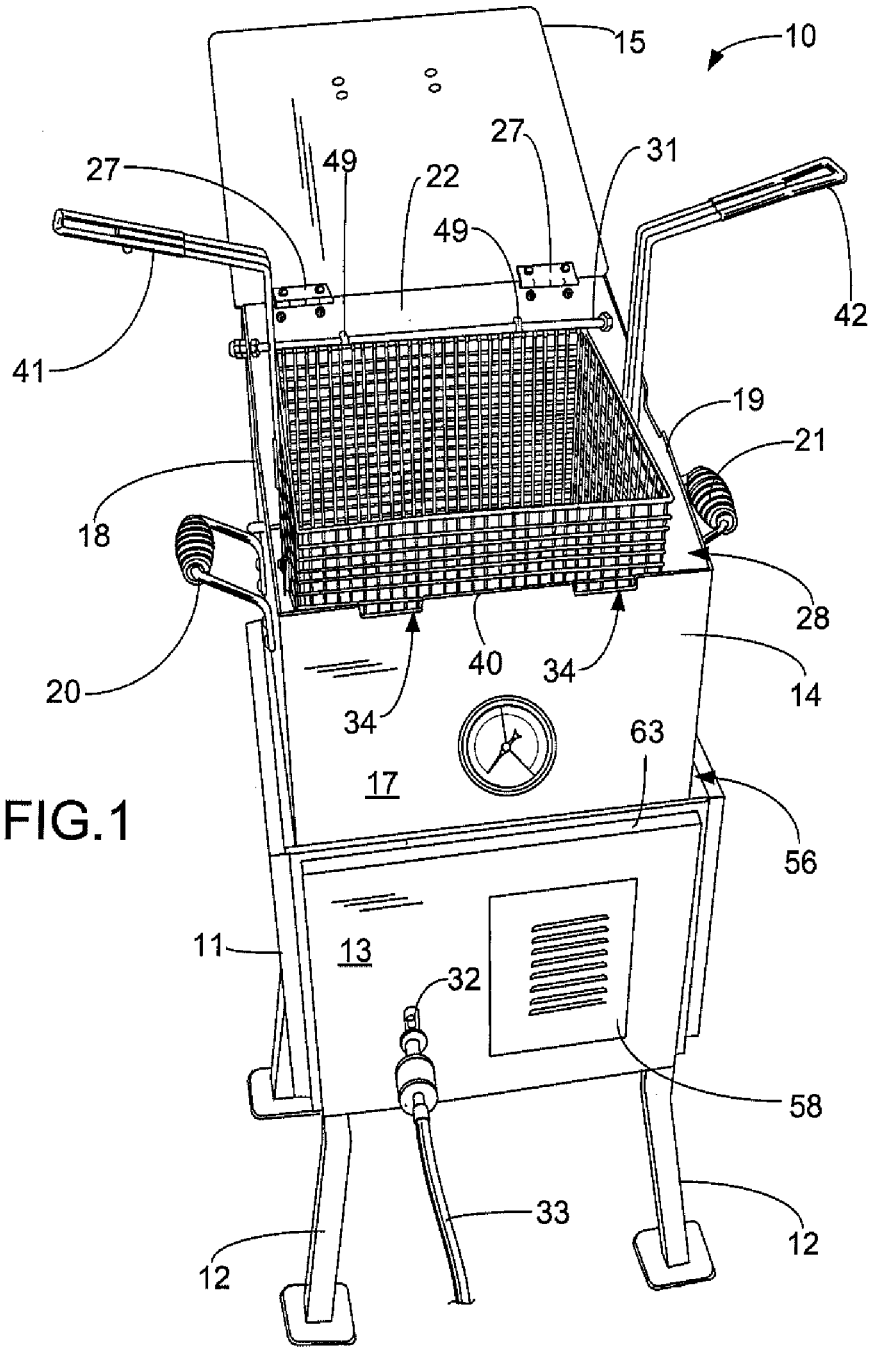
FIG. 1 is a front perspective view of a preferred embodiment of the apparatus of the present invention.
Figure 2:
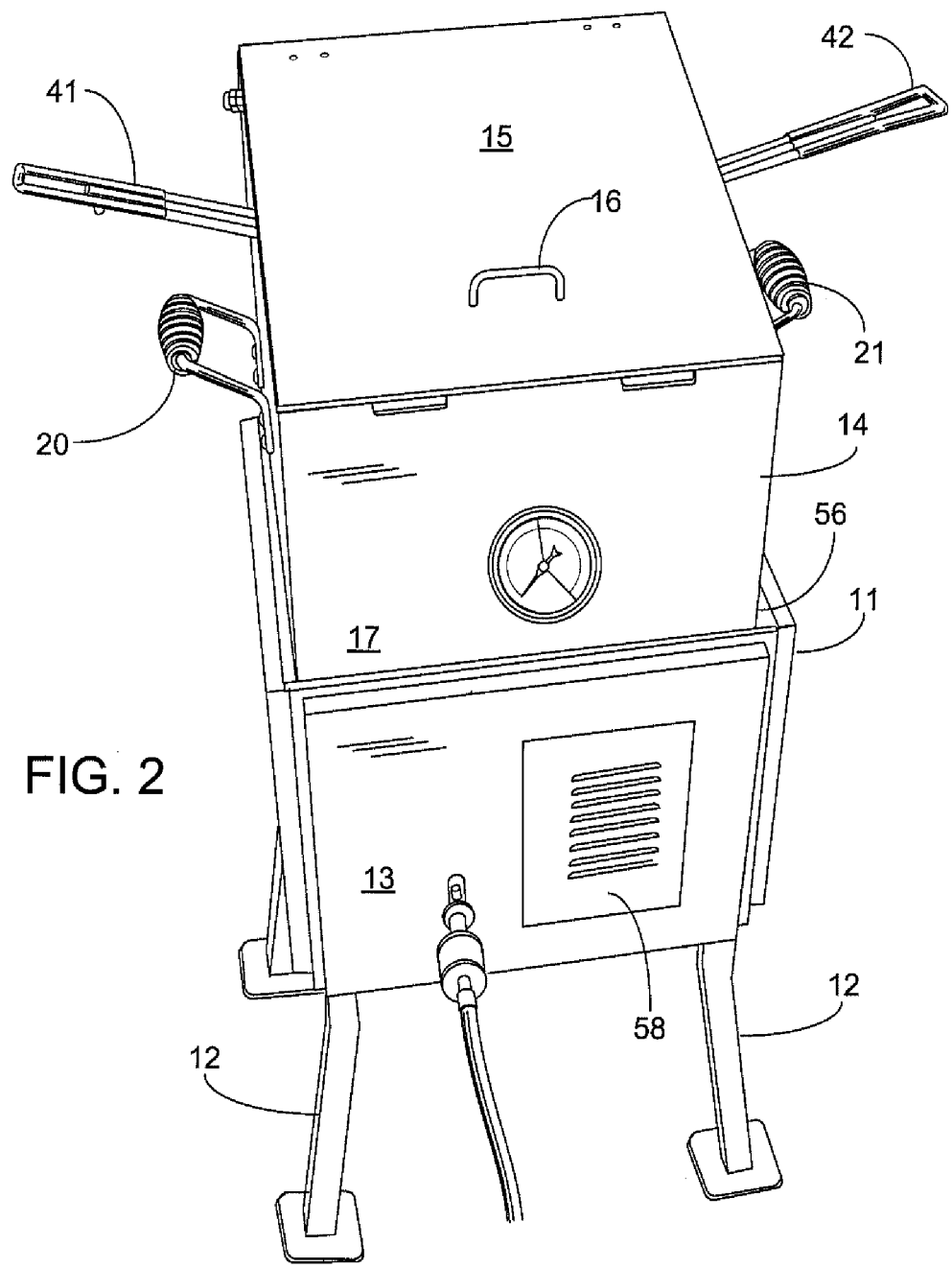
FIG. 2 is a perspective view of a preferred embodiment of the apparatus of the present invention.
Figure 3:
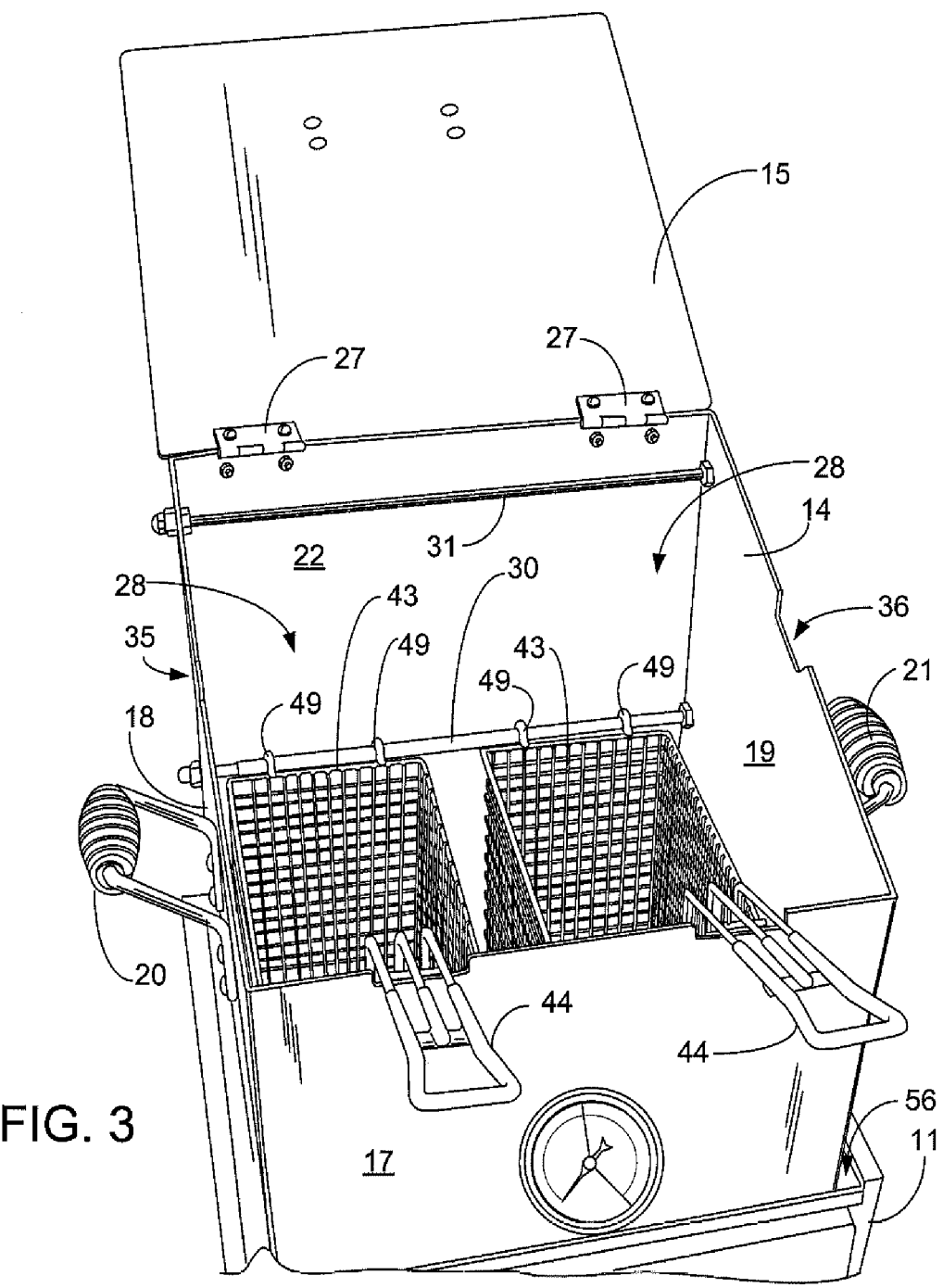
FIG. 3 is a fragmentary view of a preferred embodiment of the apparatus of the present invention.
Figure 4:
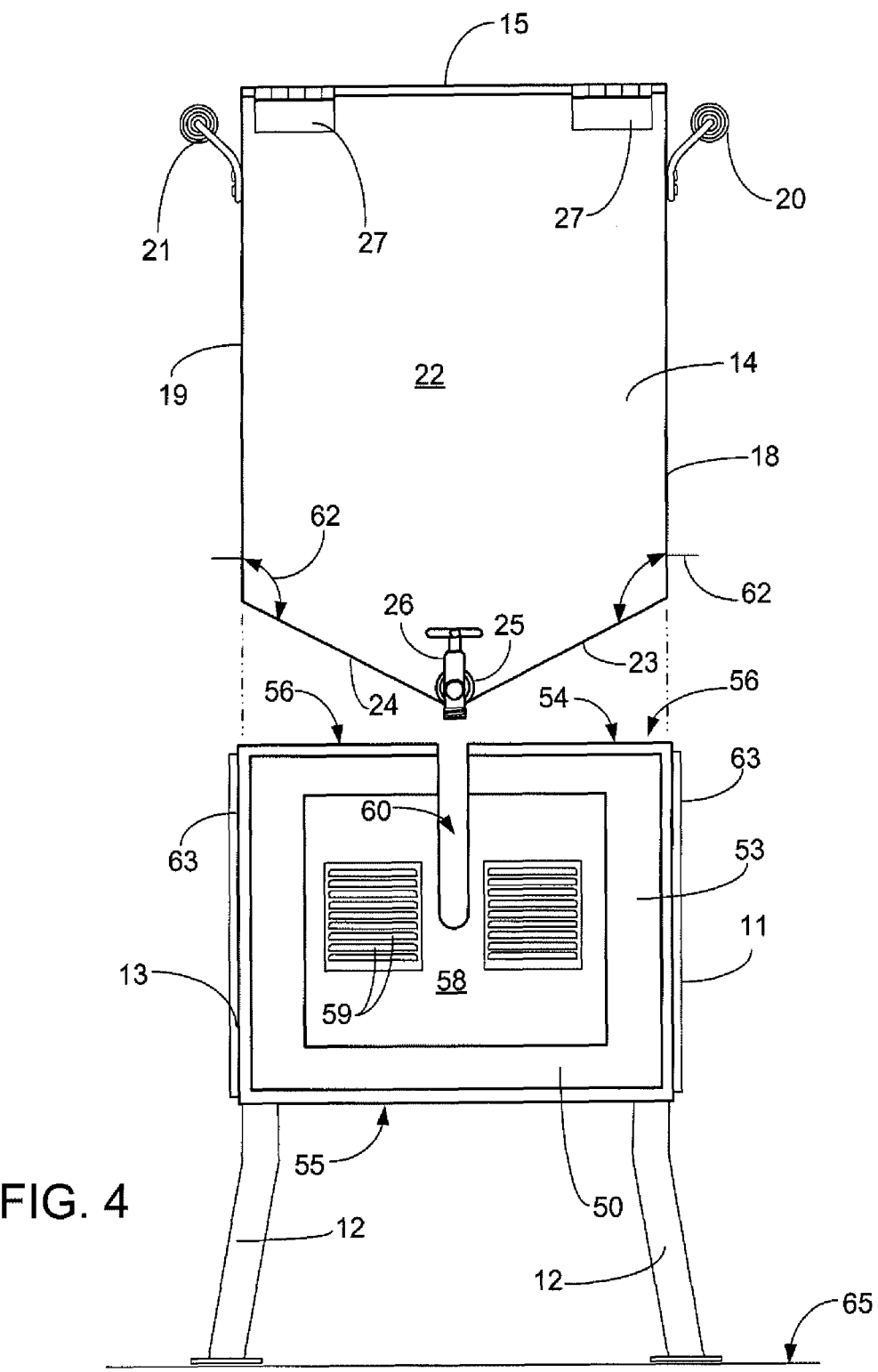
FIG. 4 is a rear elevation view of a preferred embodiment of the apparatus of the present invention.

FIGS. 1-11 show a preferred embodiment of the apparatus of the present invention designated generally by the numeral 10. Outdoor frying apparatus 10 provides a frame 11. The frame 11 can be somewhat elevated, supported on a plurality of legs 12. An upper end portion of the frame provides a cabinet 13 that is receptive of pot 14.

Figure 5:
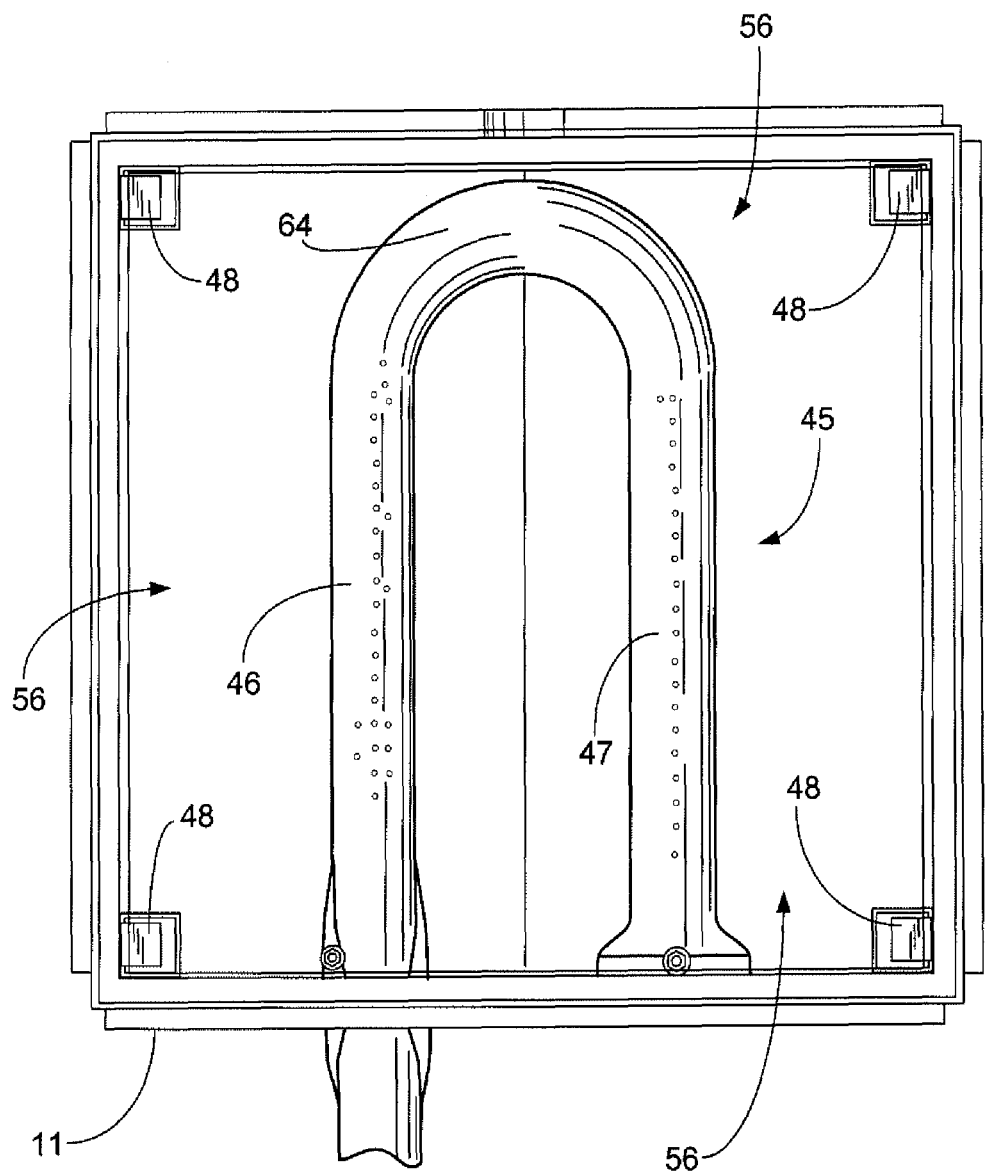
FIG. 5 is a fragmentary top view of a preferred embodiment of the apparatus of the present invention.
Figure 6:
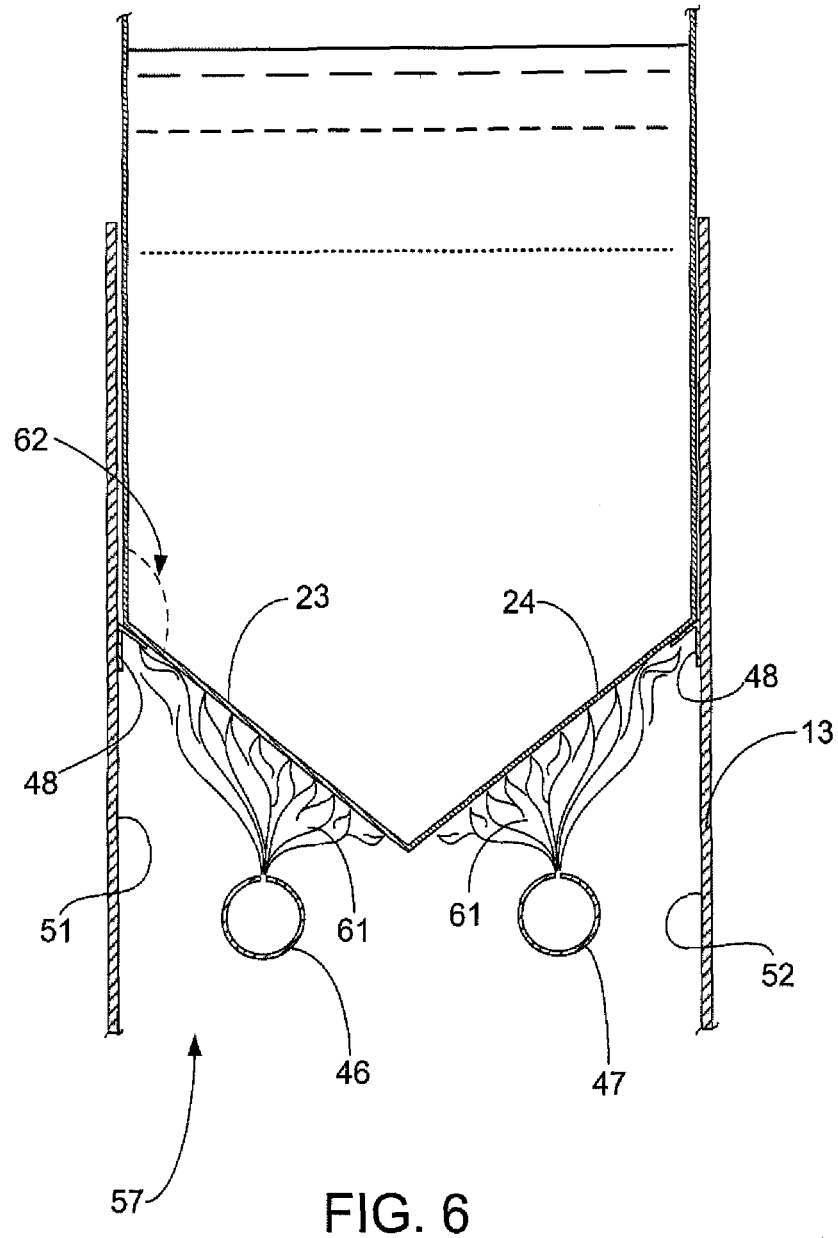
FIG. 6 is a fragmentary elevation view of a preferred embodiment of the apparatus of the present invention.
Figures 7, 8:
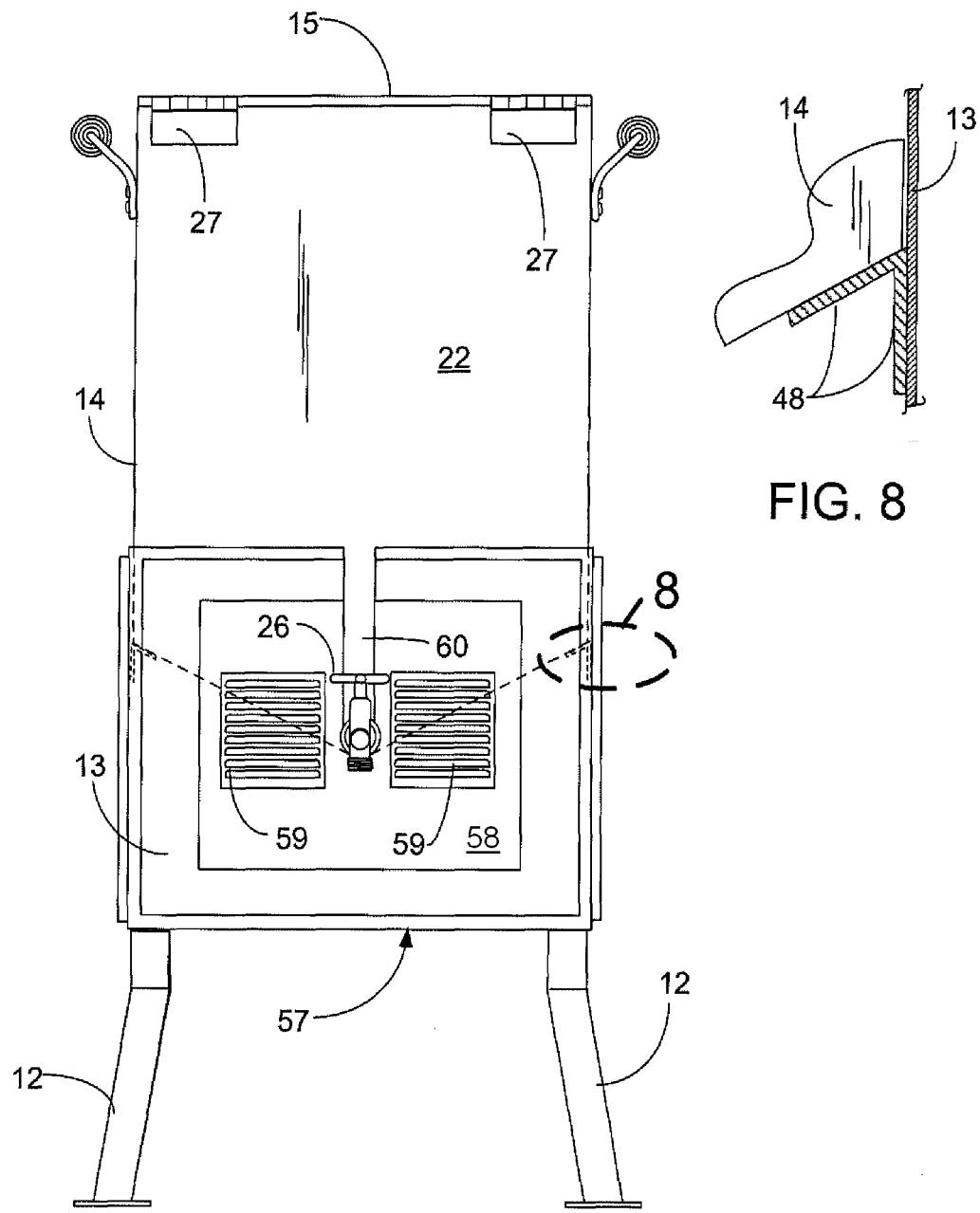
FIG. 7 is a fragmentary rear elevation view of a preferred embodiment of the apparatus of the present invention.
FIG. 8 is a fragmentary view illustrating the pot support portion of the apparatus of the present invention.
Figure 9:
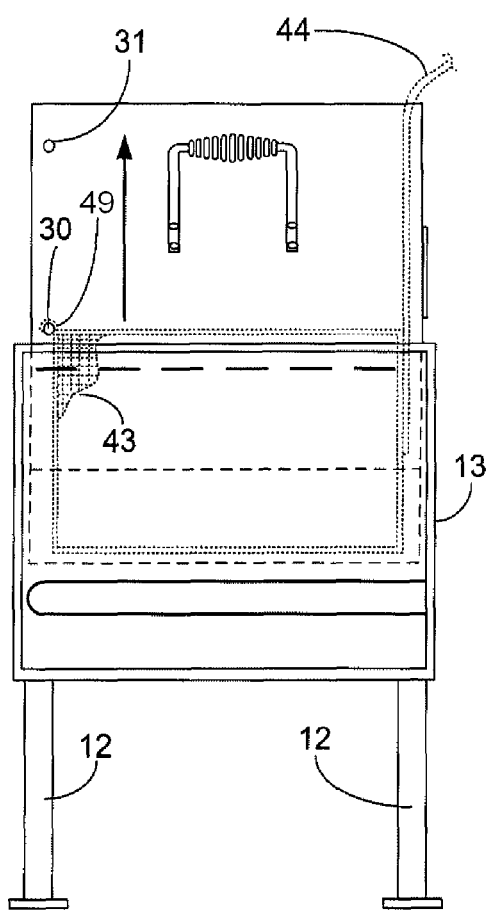
FIG. 9 is a side elevation view of a preferred embodiment of the apparatus of the present invention.
Figure 10:
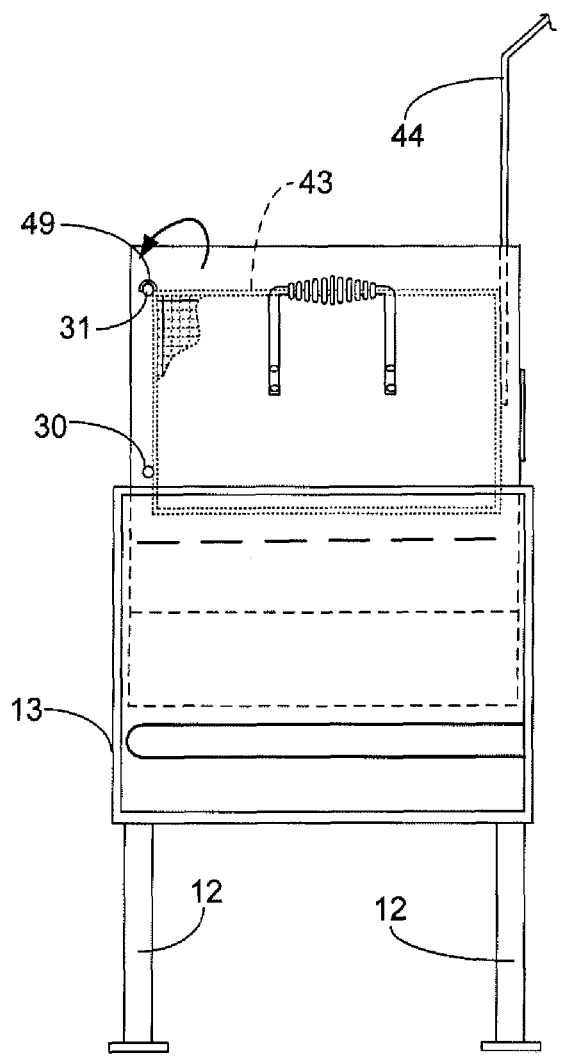
FIG. 10 is a side elevation view of a preferred embodiment of the apparatus of the present invention.
Figure 11:
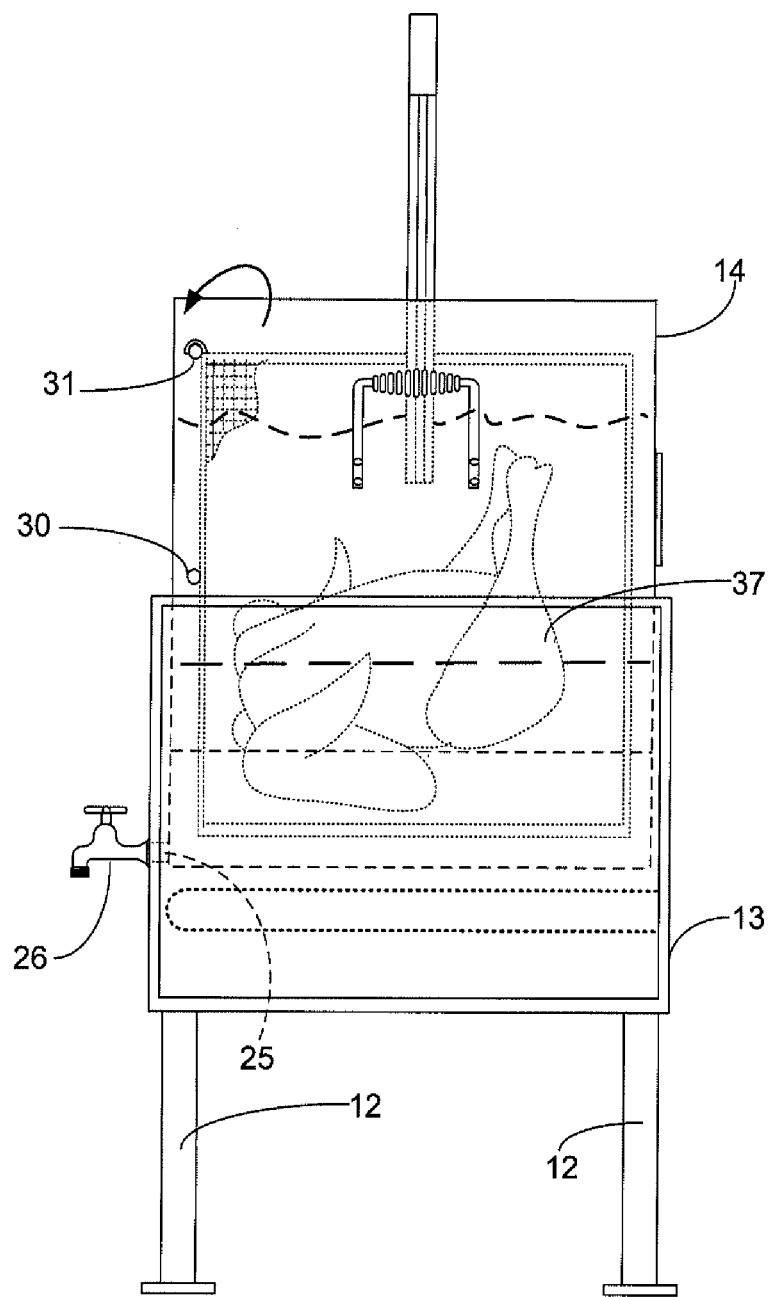
FIG. 11 is a side elevation view of a preferred embodiment of the apparatus of the present invention.
Figures 12, 13:
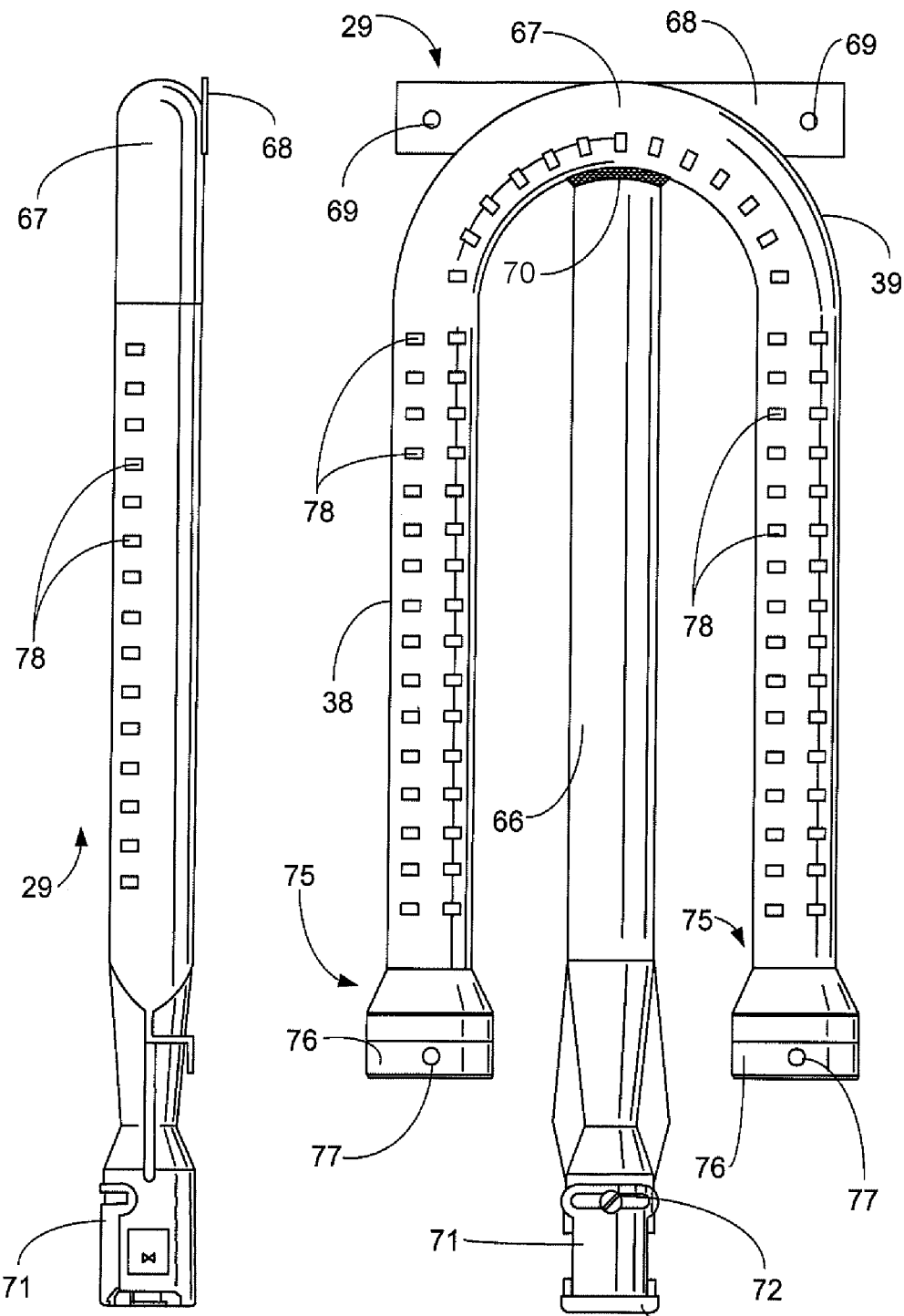
FIG. 12 is a top fragmentary view of a preferred embodiment of the apparatus of the present invention showing an alternate burner arrangement.
FIG. 13 is a side fragmentary view of a preferred embodiment of the apparatus of the present invention showing an alternate burner arrangement.
Figure 14:
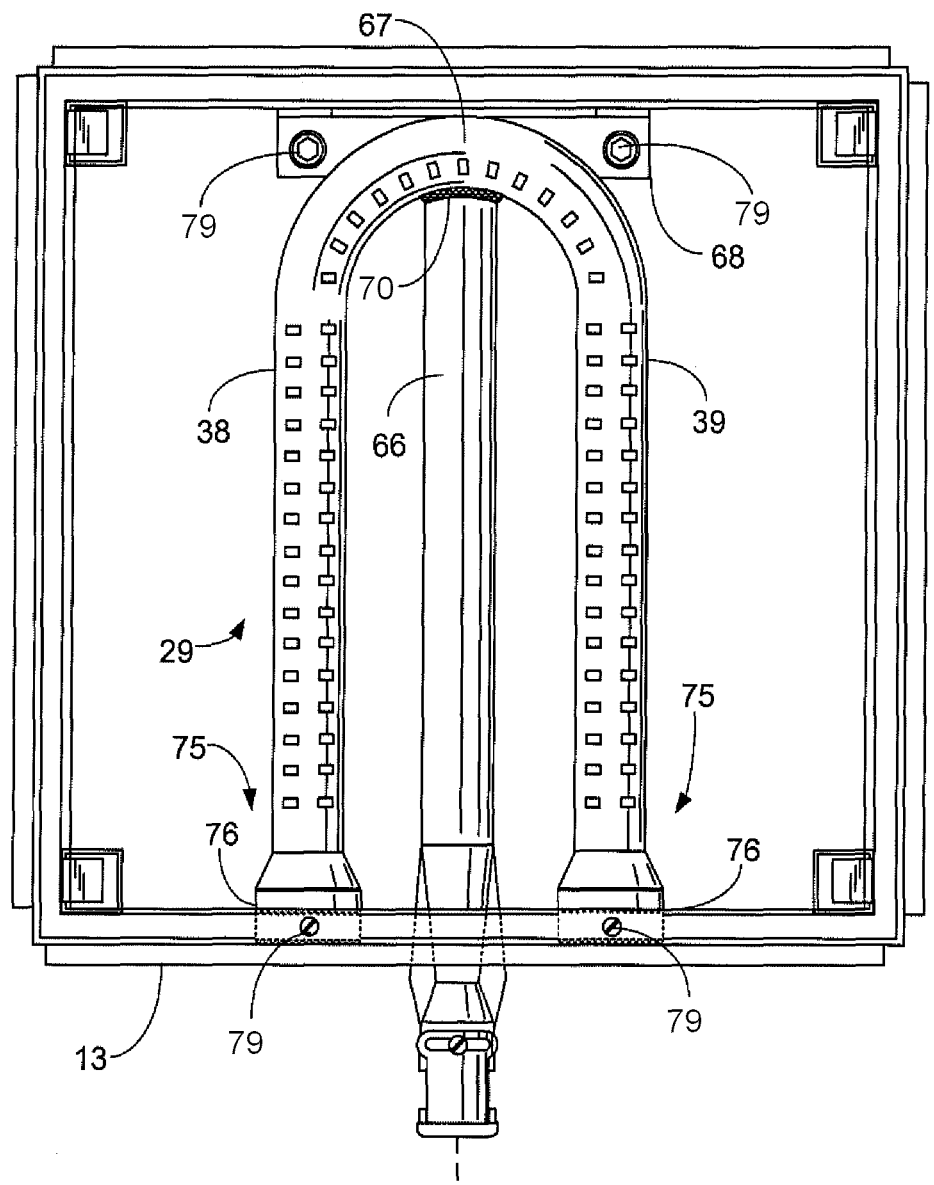
FIG. 14 is a top fragmentary view of a preferred embodiment of the apparatus of the present invention showing an alternate burner arrangement.
Figure 15:
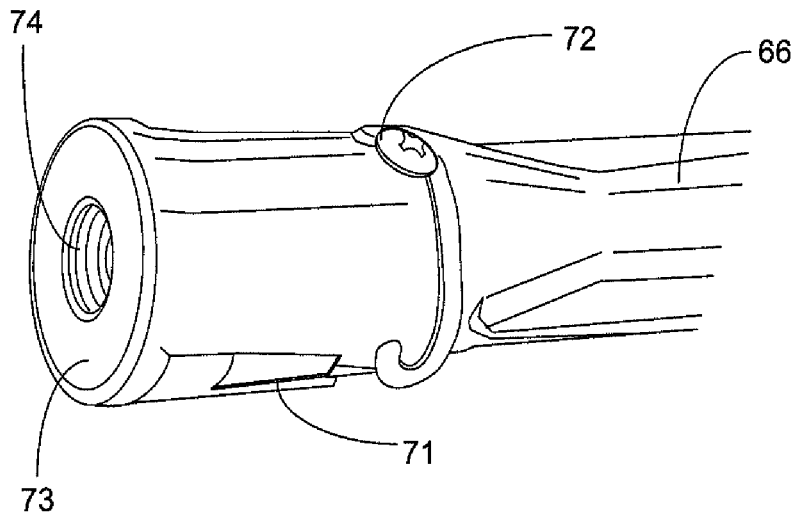
FIG. 15 is a perspective fragmentary view of a preferred embodiment of the apparatus of the present invention showing an alternate burner arrangement.
Figure 16:
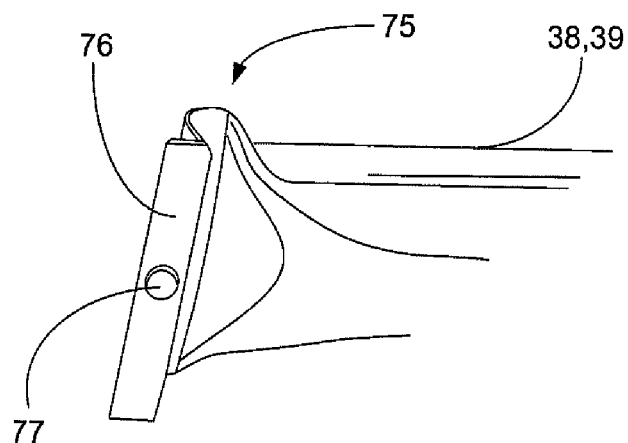
FIG. 16 is a perspective fragmentary view of a preferred embodiment of the apparatus of the present invention showing an alternate burner arrangement.

Pot 14 is specially configured to receive heat transfer or flame 61 from burner 45. The burner 45 provides first and second generally parallel burner elements 46, 47 as shown in FIGS. 5-6. Elements 46, 47 can be connected with elbow (e.g., 180° elbow) or bend section 64.

In FIGS. 1-4, pot 14 has a lid 15 that pivotally attaches to rear panel 22. Lid 15 can be moved between open and closed positions using handle 16. The rear panel 22 is joined to a pair of side panels 18, 19. The side panels 18, 19 are joined to front panel 17. A pair of bottom panels 23, 24 are provided, each panel 23, 24 being inclined so that each of the bottom panels 23, 24 forms an obtuse angle 62 with a pot side wall 18 or 19 as shown in FIG. 6. The pot 14 can be lifted from the frame 11 using handles 20, 21.

The frame 11 provides a plurality of supports 48 (see FIG. 6) that engages the bottom panels 23, 24 of the pot 14, holding pot 14 lid 15 at a elevation of about thirty and thirty-six inches (30"-36") above an underlying support surface 65 (e.g. concrete slab). Supports 48 include a plurality of angled plates that are sized and shaped to engage the V shaped pot bottom 23, 24 of the pot 14 when the pot is in the cooking position (see FIGS. 6-8). The outdoor frying apparatus 10 of the present invention is designed to be partially filled with a cooking oil such as peanut oil or the like. When cooking is completed and the 15 cooking medium (e.g., peanut oil) has cooled, a drain outlet opening 25 enables the oil to be drained through valve 26 and into a selected container for reuse. After cooking is completed, a lid 15 can be moved to a closed position by rotating the lid about hinges 27. The lid 15 enables the pot interior 28 to be covered after cooking is completed and prevent the falling of any debris such as leaves into the pot 14 interior 28.

Pot 14 can be provided with a stop that limits the degree of opening of lid 15. The pot 14 interior 28 is provided with a pair of spaced apart rods 30, 31 that extend transversely from one side panel 18 to the other side panel 19 (see FIG. 3). These rods 30, 31 include a lower rod 30 and a upper rod 31. Each rod 30, 31 is receptive of a smaller basket 43 (or pair of baskets 43), each having a handle 44. The basket 43 has a hanger 49 such as a pair of hooks that enables the pot to be supported by the rod 30 or 31 in a selected position (see FIGS. 3 and 9-10). The lower rod 30 enables the basket 43 to be supported in a lower position, such as during frying of food (see FIGS. 3 and 9). The upper rod 31 enables the basket 43 to be positioned in an elevated position, such as after cooking and wherein food contained within the basket 43 is draining of excess oil (see FIG. 10).

Cabinet 13 provides an opening 32 for fuel line 33. The fuel line 33 supplies fuel to the burner 45 and burner elements 46, 47. A canister of cooking fuel (such as butane or propane) can be connected to fuel line 33.

A second basket that can be used with the apparatus 10 of the present invention is the basket 40 having a pair of handles 41, 42. Thus, a user can select either of the baskets 40 or 43 for cooking food articles. The basket 40 is for cooking a larger food item, such as a turkey 37. The basket 40 thus has two handles 41, 42, each handle 41, 42 nesting in a recess provided on a pot side panel 18 or 19. The side panel 18 thus provides recess or cut out 35. The side panel 19 provides recess or cut out 36. For the smaller baskets 43, recesses or cut outs 34 are provided in the front panel 17 of pot 14 as shown in FIG. 1.

The cabinet 13 can be comprised of a plurality of walls or panels. For example, the cabinet 13 can provide a front panel 50, side panels 51, 52 and a cabinet rear panel 53. The cabinet 13 has an upper edge 54 and a lower edge 55. The upper edge 54 surrounds open top 56. The lower edge surrounds open bottom 57.

Each of the cabinet panels 50-53 can be provided with one or more louvered cooler or cooler panels 58. The panels 58 are basically spaced away from each of the cabinet panels 50-53 using horizontal flanges 63. Louver openings 59 enable air to interchange with the interior portion of each of the louvered coolers 58. The rear panel 53 can be provided with a pair of such coolers 58, each having louver openings 59 with a vertical slot 60 there between. In this fashion, when the pot 14 is placed upon the frame 11, valve 26 travels downwardly through slot 60 and occupies a portion of the slot 60 when cooking.

FIGS. 12-16 show an alternate burner that can be used in place of the burner 45. In FIGS. 12-16, the burner element is designated generally by the numeral 29. Burner 29 has a pair of spaced apart burner elements 38, 39. Each burner element 38, 39 has outlet openings 78 for dispensing a gaseous fuel product (e.g. butane) that is to be ignited for generating a flame and heat. An influent flow line 66 conveys fuel from inlet fitting 73 and internally threaded opening 74 (receptive of a fuel conveying hose) to burner elements 38, 39. A joint or connection 70 joins influent flow line 66 to elbow fitting or section 67. In this fashion, fuel flows from a supply hose to inlet opening 74 and through influent pipe section 66 to burner elements 38, 39 and then is emitted via openings 78 to be ignited and form flames to heat. Air control 71 provides for adjustable air intake. Set screw 72 can affix the air intake at any selected opening size or volume. Mounting plate 68 has openings 69. Mounting plates 76 at closed end 75 of each burner element 38, 39 have openings 77. Fasteners 79 can be used to attach each mounting plate 68, 76 to cabinet 13.

PARTS LIST

The following is a list of parts and materials suitable for use in the present invention:

| Parts Number | Description |
| --- | --- |
| 10 | outdoor flying apparatus |
| 11 | frame |
| 12 | leg |
| 13 | cabinet |
| 14 | pot |
| 15 | lid |
| 16 | handle |
| 17 | front panel |
| 18 | side panel |
| 19 | side panel |
| 20 | handle |
| 21 | handle |
| 22 | rear panel |
| 23 | bottom panel |
| 24 | bottom panel |
| 25 | drain outlet |
| 26 | valve |
| 27 | hinge |
| 28 | interior |
| 29 | burner |
| 30 | lower rod |
| 31 | upper rod |
| 32 | opening |
| 33 | fuel line |
| 34 | cut out/recess |
| 35 | cut out/recess |
| 36 | cut out/recess |
| 37 | turkey |
| 38 | burner element |
| 39 | burner element |
| 40 | basket |
| 41 | handle |
| 42 | handle |
| 43 | basket |
| 44 | handle |
| 45 | burner |
| 46 | burner element |
| 47 | burner element |
| 48 | pot support |
| 49 | hanger |
| 50 | cabinet front panel |
| 51 | cabinet side panel |
| 52 | cabinet side panel |
| 53 | cabinet rear panel |

-continued

| Parts Number | Description |
| --- | --- |
| 54 | upper edge |
| 55 | lower egde |
| 56 | open top |
| 57 | open bottom |
| 58 | louvered cooler/cooler panel |
| 59 | louver opening |
| 60 | slot |
| 61 | flame |
| 62 | angle |
| 63 | flange |
| 64 | elbow/bend section |
| 65 | support surface |
| 66 | influent flow line |
| 67 | elbow |
| 68 | mounting plate |
| 69 | opening |
| 70 | joint/connection |
| 71 | air control |
| 72 | set screw |
| 73 | inlet end portion |
| 74 | internally threaded inlet opening |
| 75 | closed end |
| 76 | mounting plate |
| 77 | opening |
| 78 | opening |
| 79 | fastener |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An outdoor food frying apparatus comprising:
   a) a frame which includes a cabinet having a cabinet interior surrounded by multiple cabinet walls, including a front wall, a rear wall and side walls with one or more inside surfaces, an open top and an open bottom, the frame having a pot support mounted on the one or more inside surfaces of said side walls;
   b) a burner element supported upon the frame and within the cabinet interior at a burner element elevation, the burner element including a pair of spaced apart burner sections;
   c) a pot that removably fits the cabinet interior and is movable between cooking and removed positions, the pot being removable from the cabinet interior to the removed position by elevation of the pot vertically via the open top, the pot resting upon the pot support in said cooking position, the pot having a V shaped bottom comprised of a pair of panels that intersect to form an angle, a plurality of generally flat pot sidewalls, and an interior for holding cooking fluid;
   d) wherein in said cooking position, the pot is spaced above the burner elements which are not positioned within the pot interior, each burner element being spaced below the V shaped bottom, one of the burner elements directing a flame against one of the bottom panels, the other of the burner elements directing a flame against the other of the bottom panels; and
   e) the cabinet providing one or more coolers with air openings positioned at least in part below the V shaped bottom when the pot is in the cooking position.

2. The outdoor food frying apparatus of claim 1 further comprising the pot having a drain opening.

3. The outdoor food frying apparatus of claim 2 further comprising a valve connected to the drain opening.

4. The outdoor food frying apparatus of claim 3 further comprising a slot on the cabinet that extends downwardly from the open top, the valve traveling in the slot when the pot is placed upon the frame and into the cabinet via the open top, moving from the removed position and into the cooking position.

5. The outdoor food frying apparatus of claim 1 further comprising a basket that fits the pot interior, said basket having two handles on opposite sides of the basket.

6. The outdoor food frying apparatus of claim 5 wherein the pot has multiple side walls and each pot side wall has a recess that accepts a pot handle.

7. The outdoor food frying apparatus of claim 5 further comprising a pair of transverse rods, including an upper transverse rod and a lower transverse rod, and hangers on the basket that enable the basket to be supported upon either of the rods.

8. The outdoor food frying apparatus of claim 7 wherein the transverse rods are positioned next to the rear cabinet wall.

9. The outdoor food frying apparatus of claim 1 further comprising a pair of baskets, each basket having a handle that extends in front of the cabinet.

10. The outdoor food frying apparatus of claim 9 wherein the pot has a front wall and the pot front wall has a pair of recesses that each accept a pot handle.

11. The outdoor food frying apparatus of claim 9 further comprising a pair of transverse rods, including an upper transverse rod and a lower transverse rod, and hangers on each of the baskets that enable either basket to be supported upon either of the rods.

12. The outdoor food frying apparatus of claim 11 wherein the transverse rods are positioned next to the rear cabinet wall.

13. An outdoor food frying apparatus comprising:
   a) a frame which includes a cabinet having multiple walls, including a front wall, a rear wall and side walls, the cabinet having one or more pot supports, an open top and an open bottom;
   b) a burner supported upon the frame and positioned next to the open bottom of the cabinet, the burner including a pair of spaced apart burner sections;
   c) a pot that removably fits the cabinet interior and being movable between removed and cooking positions, wherein the pot rests upon a said pot support in said cooking position, the pot having a V-shaped bottom comprised of a pair of bottom panels that intersect to form an obtuse angle and a plurality of generally flat pot sidewalls that each extend upwardly from a said pot bottom panel;
   d) one of the burner sections spaced below the V-shaped bottom and directing a flame against one of the bottom panels, the other of the burner sections spaced below the V-shaped bottom and directing a flame against the other of the bottom panels;
   e) a plurality of baskets that selectively fit the pot interior including one basket that fills the cabinet interior and a second basket that is much smaller than the first basket;
   f) the cabinet having one or more coolers with air openings, said one or more coolers extending at least in part below said V shaped bottom when the pot is in the cooking position; and
   g) wherein the open top is sized and shaped to enable removal of the pot upwardly from the cabinet via said open top.

14. The outdoor food frying apparatus of claim 13 further comprising the pot having a drain opening.

15. The outdoor food frying apparatus of claim 14 further comprising a valve connected to the drain opening.

16. The outdoor food frying apparatus of claim 15 further comprising a slot on the cabinet that extends to the open top, the valve traveling in the slot when the pot is placed upon the frame in the cooking position.

17. The outdoor food frying apparatus of claim 13 wherein the pot has one or more side walls, at least one said side wall having a recess that accepts a pot handle.

18. The outdoor food frying apparatus of claim 17 wherein the pot has a front wall, and wherein the pot front wall has one or more of recesses that each accept a pot handle.

19. The outdoor food frying apparatus of claim 13 further comprising a pair of transverse rods, including an upper transverse rod and a lower transverse rod, and hangers on the basket that enable the basket to be supported upon either of the rods.

20. The outdoor food frying apparatus of claim 19 wherein the transverse rods are positioned next to the rear cabinet wall.

21. The outdoor food frying apparatus of claim 13 further comprising a pair of transverse rods, including an upper transverse rod and a lower transverse rod, and hangers on each of the baskets that enable either basket to be supported upon either of the rods.

22. The outdoor food frying apparatus of claim 21 wherein the transverse rods are positioned next to the rear cabinet wall.

23. The outdoor food frying apparatus of claim 1 wherein the pot support include a plurality of angled plates that are sized and shaped to engage the V shaped pot bottom of the pot when the pot is in the cooking position.

24. The outdoor food frying apparatus of claim 13 wherein the pot support include a plurality of angled plates that are sized and shaped to engage the V shaped pot bottom of the pot when the pot is in the cooking position.

* * * * *